United States Patent
Kinsey, Jr.

(10) Patent No.: US 9,410,510 B2
(45) Date of Patent: Aug. 9, 2016

(54) AIR CLEANER ARRANGEMENT

(71) Applicant: Caterpillar Inc., Peoria, IL (US)

(72) Inventor: Bobby J. Kinsey, Jr., Washington, IL (US)

(73) Assignee: Caterpillar Inc., Peoria, IL (US)

(*) Notice: Subject to any disclaimer, the term of this patent is extended or adjusted under 35 U.S.C. 154(b) by 114 days.

(21) Appl. No.: 14/223,231

(22) Filed: Mar. 24, 2014

(65) Prior Publication Data

US 2015/0267653 A1    Sep. 24, 2015

(51) Int. Cl.
  *F02M 35/024* (2006.01)
  *F02M 35/02* (2006.01)

(52) U.S. Cl.
  CPC ..... *F02M 35/02483* (2013.01); *F02M 35/0201* (2013.01); *F02M 35/0203* (2013.01); *F02M 35/02416* (2013.01)

(58) Field of Classification Search
  CPC ............... B01D 46/0012; B01D 46/10; B01D 46/0001; B01D 46/0004; B01D 46/0005; B01D 46/002; B01D 46/103; B01D 46/0021; B01D 29/15
  USPC ........... 55/498, 502, 331, 482, 484, 357, 521, 55/529; 95/273; 123/198 E; 210/282, 210/323.1
  See application file for complete search history.

(56) References Cited

U.S. PATENT DOCUMENTS

| | | | | |
|---|---|---|---|---|
| 4,749,485 A * | 6/1988 | DeGraffenreid | ....... | B01D 29/15 210/323.1 |
| 5,613,992 A | 3/1997 | Engel | | |
| 5,888,260 A * | 3/1999 | Sica | ................... | B01D 46/0012 55/331 |
| 6,482,247 B2 * | 11/2002 | Jaroszczyk | ............ | B01D 46/10 55/484 |
| 7,413,588 B2 * | 8/2008 | Holzmann | ......... | B01D 46/0005 210/282 |
| 7,520,913 B2 * | 4/2009 | Mills | .................... | B01D 46/002 210/323.1 |
| 8,317,890 B2 * | 11/2012 | Raether | ................ | B01D 46/103 55/498 |
| 8,709,116 B2 * | 4/2014 | Muenkel | ............ | B01D 46/0021 123/198 E |
| 2004/0134171 A1 * | 7/2004 | Scott | .................. | B01D 46/0001 55/482 |
| 2004/0173097 A1 * | 9/2004 | Engelland | .......... | B01D 46/0004 95/273 |
| 2013/0228504 A1 | 9/2013 | McElroy et al. | | |
| 2014/0250843 A1 * | 9/2014 | Krull | .................. | B01D 46/0005 55/357 |

* cited by examiner

*Primary Examiner* — Duane Smith
*Assistant Examiner* — Minh-Chau Pham
(74) *Attorney, Agent, or Firm* — Leydig, Voit & Mayer, Ltd.

(57) ABSTRACT

An air cleaner arrangement for filtering air includes a filter element receivable inside a housing. The filter element longitudinally extends along an axis line between a first end surface and a second end surface. The filter element can be shaped as a tapering polyhedron including at least one planar exterior surface that depends from the first end surface to the second end surface with respect to the axis line. When received in the housing, the depending exterior surface diverges away from the sidewall of the housing to create an expanding plenum. The plenum facilities even distribution of air along the axial length of the filter element.

10 Claims, 5 Drawing Sheets

AIR CLEANER ARRANGEMENT

TECHNICAL FIELD

This patent disclosure relates generally to an air cleaner arrangement for filtering fluids such as intake air and more particularly to a filter element and a housing designed to improve air distribution to the filter media.

BACKGROUND

Air cleaner arrangements are used to filter air to remove contaminates such as grime, dirt, and/or other fine solids so that the cleaned air can be used for various applications, such as supplying intake air to an internal combustion engine for powering a vehicle or machine. Typically, an air cleaner arrangement includes a filter cartridge or filter element made of filter media that is semi-permeable to air flow allowing air to pass while removing the contaminates. Examples of filter media may include layers of pleated paper that can be formed into a self-supporting geometric shape. The filter media can be received and accommodated inside a complementary-shaped housing disposed in the intake system of the machine. The housing guides or directs the intake air to the filter element where the air if forced to pass across the filter media that removes dirt and contaminates before the cleaned air exits the housing. To ensure that intake air passes through the filter media, seal arrangements can be included on the filter element to press against corresponding surfaces of the housing and seal any leak paths between the element and housing.

A traditional design for an air cleaner arrangement is to accommodate a cylindrical and hollow filter element inside a correspondingly cylindrical shaped housing. Dirty fluid such as air is directed by the housing around the cylindrical exterior of the filter element, passes through the filter media to the interior of the hollow filter element, and the cleaned air can exit the filter element and housing. Another possible design is a reverse flow filter element in which dirty fluid is directed to the interior first, passes across the filter media so that clean air emerges from the cylindrical exterior of the filter element.

Over time, dirt and other contaminates will collect on the filter media clogging the filter element and resisting or preventing intake air from passing through the air cleaner arrangement. In addition to starving the associated application or process of clean intake air, a clogged filter might also suffer a catastrophic failure in which the filter element tears or is otherwise breached allowing contaminates and dirt to pass downstream of the air cleaner where they can damage the application such as an internal combustion engine or other machinery. Accordingly, it is sometimes necessary to periodically replace the filter elements with a fresh element or to remove and clean the filter element. Accordingly, filter elements may sometimes be considered disposable or consumable items or goods. However, it is also desirable to utilize the full capacity of the filter media to remove dirt and debris and prolong the life of the filter element before the element is replaced so that the value of the filter element is maximized. The present disclosure is directed to improving the usefulness and perceived value of a filter element in an air cleaner arrangement.

SUMMARY

The disclosure describes, in one aspect, an air cleaner arrangement including a filter element and a housing. The filter element can be shaped as a polyhedron that extends along and tapers with respect to an axis line between a first end surface and a second end surface. The first and second end surfaces can be oriented orthogonally to the axis line and the first end surface can be larger in area than the second end surface. The housing can include a tubular shell adapted to receive the filter element. The tubular shell extends between a first shell edge and a second shell edge and has a cross-section corresponding in shape to the filter element that is shaped as a polyhedron.

In another aspect, the disclosure describes a method of filtering a fluid, such as intake air, with a filter element that is generally shaped as a polyhedron and that generally tapers along an axis line. The filter element can be disposed inside a housing having a tubular shell with a generally corresponding polyhedron cross-section to the filter element. The method directs fluid into the air cleaner arrangement through an inlet port disposed in the housing and distributes that the fluid in a plenum delineated between an exterior surface of the filter element and a sidewall of the tubular shell. The plenum generally increases in area within the tubular shell from one end to the other along the along the axis line. The fluid is directed through the filter element from the exterior surface to a center tube centrally disposed in a filter media, the filter element. The cleaned fluid can be exhausted from the air cleaner arrangement through an outlet port in communication with the center tube.

In yet another aspect, the disclosure provides a filter element that includes a center tube disposed along an axis line between a first element end having a first end surface and a second element end having a second end surface. The first end surface and the second end surfaces are generally orthogonal to the axis line. The filter element further includes a filter media disposed about the center tube and that extends outward from the center tube to delineate an exterior. The exterior is shaped as a polyhedron with at least one first exterior surface that is planar and that depends at an angle with respect to the axis line from the first element end to the second element end.

DETAILED DESCRIPTION

Figure 1:
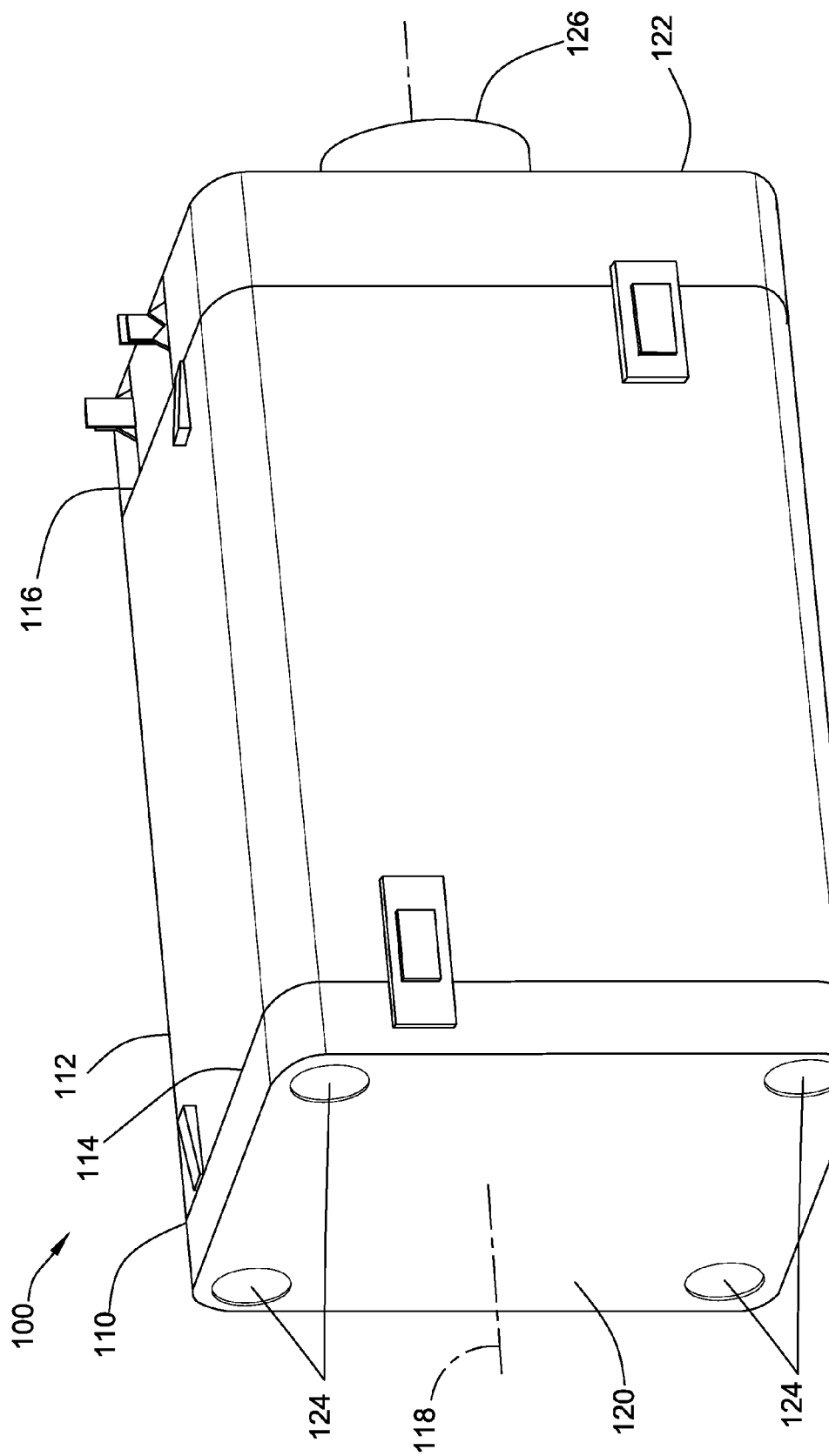
FIG. 1 is a perspective view of an air cleaner arrangement for filtering intake air assembled together in a housing having a polygonal, particularly a rectangular, shape.

Now referring to the drawings, wherein like reference numbers refer to like elements, there is illustrated in FIG. 1 an air cleaner arrangement 100 for filtering fluid to be used in a application or process, and more particularly for filtering air from the environment for use in an application that requires clean air. An example of an appropriate application is to supply combustion air for combustion with a hydrocarbon-based fuel in an internal combustion engine. Internal combustion engines may be utilized on machines that are intended to perform some type of operation associated with an industry such as mining, construction, farming, transportation, or any other industry known in the art. For example, the machine may be a vehicle such as a tractor-trailer rig, an earth-moving machine, such as a wheel loader, excavator, dump truck, backhoe, motor grader, material handler or the like, or a stationary machine such as a pump or compressor. However, in other embodiments, the air cleaner arrangement 100 can be used in any other suitable application that requires a source of clean air. The air cleaner arrangement removes contamination such as fine particles and the like from the air that would otherwise adversely affect the associated process.

The air cleaner arrangement 100 can include a housing 110 designed to internally receive and accommodate a filter element. The housing 110 can include a hollow tubular shell 112 that extends between a first shell edge 114 and an opposing, second shell edge 116 such that the tubular shell delineates an axis line 118 along the longitudinal direction. To enclose the tubular shell 112 when the filter element is disposed inside, the housing 110 can include a first housing cover 120 axially mounted to the first shell edge 114 in a removable manner such as, for example, with latches, fasteners, and the like. A second housing cover 122 can be removably mounted to the second shell edge 116 in a similar manner. The housing 110 of the air cleaner arrangement 100 can be disposed in the intake system associated with the internal combustion engine or other application to receive air from the surrounding environment and to communicate the air downstream. To facilitate fluid communication into and out off the air cleaner arrangement 100, the first housing cover 120 can having one or more intake ports 124 disposed through it and the second housing cover 122 can have an outlet port 126 disposed through it. In the illustrated embodiment, four inlet ports 124 can be spaced equal-distantly around the axis line 118 and the single outlet port 126 can be concentric with axis line 118. In other embodiments, though, the number and location of the inlet and outlet ports 124, 126 on the housing 110 can be different than as shown in the figures. The components of the housing 110 can be made from any suitable material such as stainless steel or a similar metallic material.

In contrast to cylindrical air cleaner arrangements typically found in the prior art, referring to FIG. 1, the disclosed air cleaner arrangement 100 can have a polygonal or polyhedronal shape with multiples planar surfaces and, more particularly, can have a rectangular shape as shown in the illustrated embodiment. In this embodiment, the tubular shell 112 can generally have a rectangular or square cross-section oriented perpendicularly with respect to the axis line 118. Due to the rectangular shape, the tubular shell 112 includes a planar first sidewall 130 that, for references purposes only, can be considered oriented toward the top of the housing 110. The tubular shell 112 further includes a parallel and spaced-apart planar second sidewall 132 oriented toward the bottom, a planar third sidewall 134 extending orthogonally between the first and second sidewalls 130, 132 and a planar fourth sidewall 136 parallel to the third sidewall 134. Accordingly, the first, second, third, and fourth sidewalls are arranged at right angles to each other to provide a square-shaped cross-section of the tubular shell. The planar sidewalls can be generally arranged equal distantly around the axis line 118. In the illustrated embodiment, the first housing cover 120 and the second housing cover 122 can have a quadrilateral or square shape corresponding to the quadrilateral or square cross-section of the tubular shell 112. The rectangular air cleaner 100 can be mounted on the machine at any suitable location and in any suitable orientation.

Figure 2:
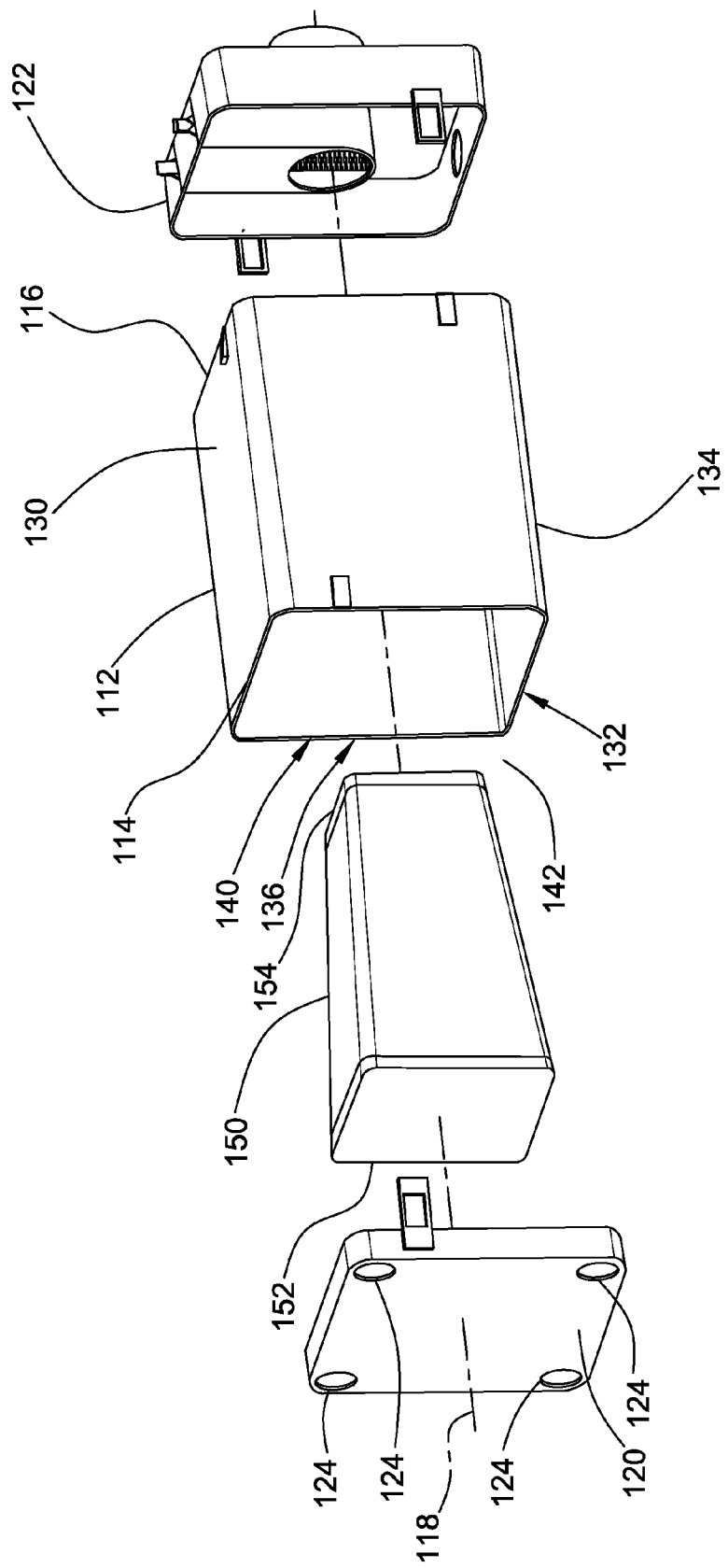
FIG. 2 is a perspective assemble view of the air cleaner arrangement showing the various components axially separated along an axis line including a tapered polyhedron filter element receivable in a tubular shell of the housing.

Referring to FIG. 2, there is illustrated the components of the air cleaner arrangement 100 in a disassembled state with the first and second housing covers 120, 122 removed from the respective first and second shell edges 114, 116 of the tubular shell 112. The intersecting sidewalls of the tubular shell 112 delineates an interior receptacle or interior chamber 140 that has as a corresponding cross-sectional shape of the polyhedron or rectangular tube shell. In the particular embodiment shown, the inlet ports 124 disposed through the first housing cover 120 can be in fluid communication with the interior chamber at the locations disposed towards or at the first shell edge 114.

To filter the intake air passing through the air cleaner arrangement 100, the arrangement can include a filter element 150 which can be shaped as a polyhedron and can be sized to be slidably received in interior chamber 140 delineated by the tubular shell 112 of the non-cylindrical housing 110 through either the first shell edge 114 and/or second shell edge 116. When assembled as part of the air cleaner arrangement, the filter element 150 can be aligned along the axis line 118 and can axially extend between a first end surface 152 and an opposite second end surface 154. Accordingly, the first end surface 152 can correspond to a first element end 156 and the second end surface 154 can correspond to an opposing second element end 158. Moreover, the first and second end surfaces 152, 154 can be generally planar and oriented orthogonally to the axis line 118. To correspond in shape to the square cross-section of the tubular shell 112, the first end surface 152 and the second end surface 154 can each have a quadrilateral shape of a smaller dimension than the tubular shell so that the filter element can fit within the interior chamber 140. In the illustrated embodiment the filter element 150 can be generally coextensive in length between the first and second end surfaces 152, 154 with the length of tubular shall 112 so that, when enclosed in the housing, the first and second end surfaces abut the first and second housing covers 120, 122. The filter element 150 can be removed from the housing 110 for replacement or cleaning by removing the first and/or second housing covers 120, 122 from the tubular shell 112.

Figure 3:
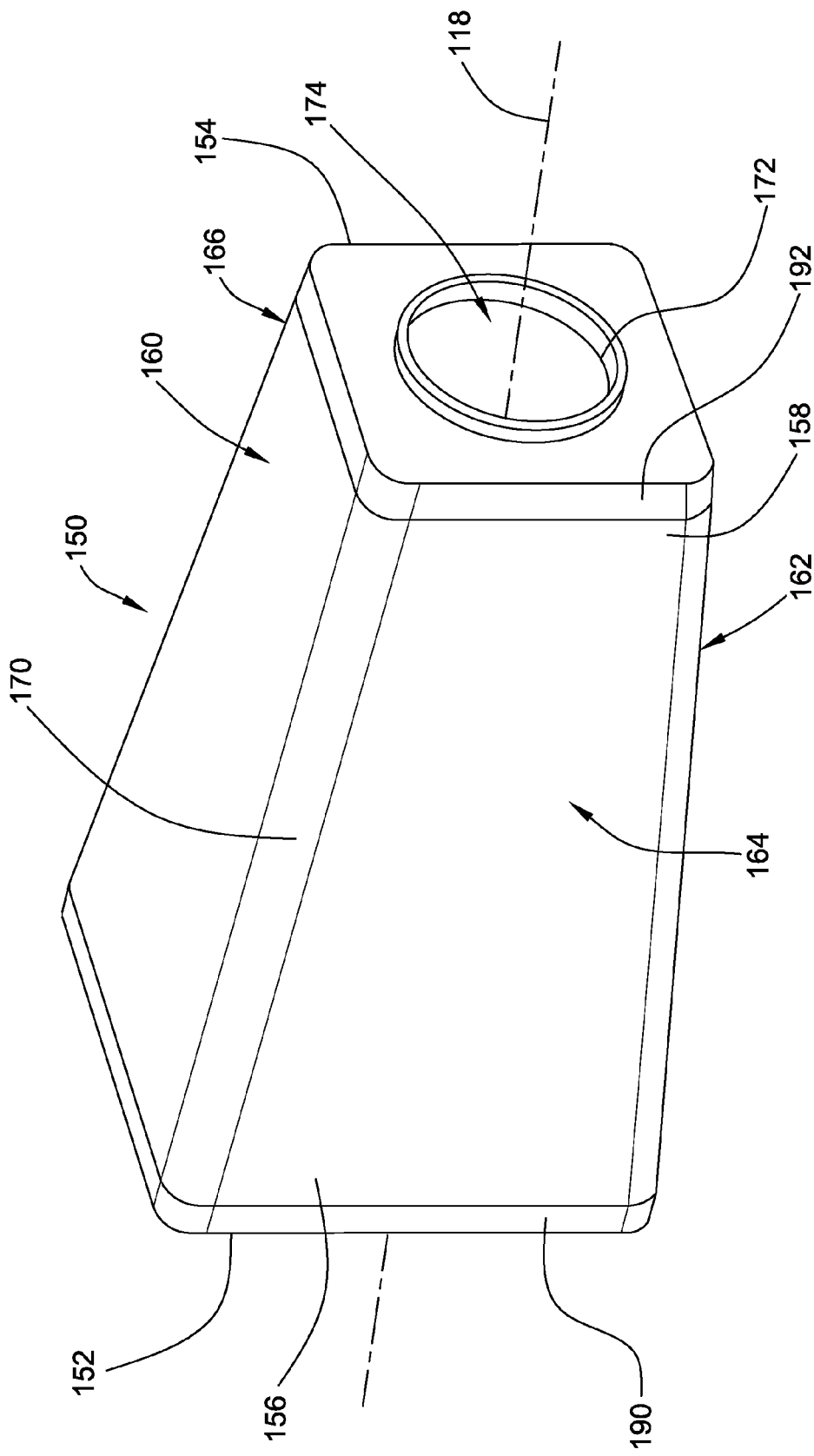
FIG. 3 is a perspective view of the filter element configured with four planar, exterior surfaces that depend inwardly to the axis line from a first axial end to a second axial end.

Referring to FIG. 3, in an embodiment, the filter element 150 can have the shape of a tapered polyhedron and, more particularly, can have a trapezoidal profile when viewed parallel to the axis line 118. To provide the trapezoidal profile, the cross-section of the polyhedron filter element 150 can taper downwards along the axis line 118 from the first end surface 152 to the second end surface 154. Accordingly, the surface area associated with the first end surface 152 can be greater than the surface area associated with the second end surface 154. To further provide the trapezoidal profile, the filter element 150 can include an exterior that surrounds the axis line 118 and that is formed by a first exterior surface 160, a second exterior surface 162, a third exterior surface 164, and a fourth exterior surface 166. Each of the exterior surfaces can have a generally planar or flat profile and can intersect each other at right angles that, in the illustrated embodiment, may be rounded. The orthogonal arrangement of the planar, exterior surfaces provides the filter element with the overall shape of a polyhedron, in contrast to the more traditional cylindrical filter elements.

The exterior surfaces 160, 162, 164, 166 are further arranged to provide the generally trapezoidal shape or profile to the filter element. For example, the first exterior surface 160 depends slightly toward the axis line 118 as it extends from the first end surface 152 toward the second end surface 154. In addition, each of the second, third, and fourth exterior surfaces 162, 164, 166 each also depend toward the axis line in similar manner. By way of example only, the angle of dependence of the first exterior surface 160 toward the axis line 118 can be on the order of 5 degrees or so. Accordingly, the filter element 150 gradually decreases in cross section from the first end surface 152 to the second end surface 154.

Figure 5:
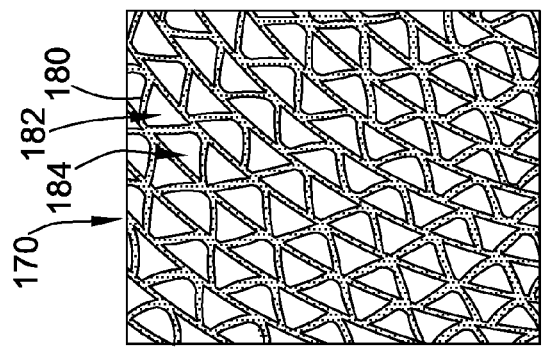
FIG. 5 is a detailed view of the filter media included in the filter element of FIG. 4 showing the pleats and flutes that channel and filter the intake air.
Figure 4:
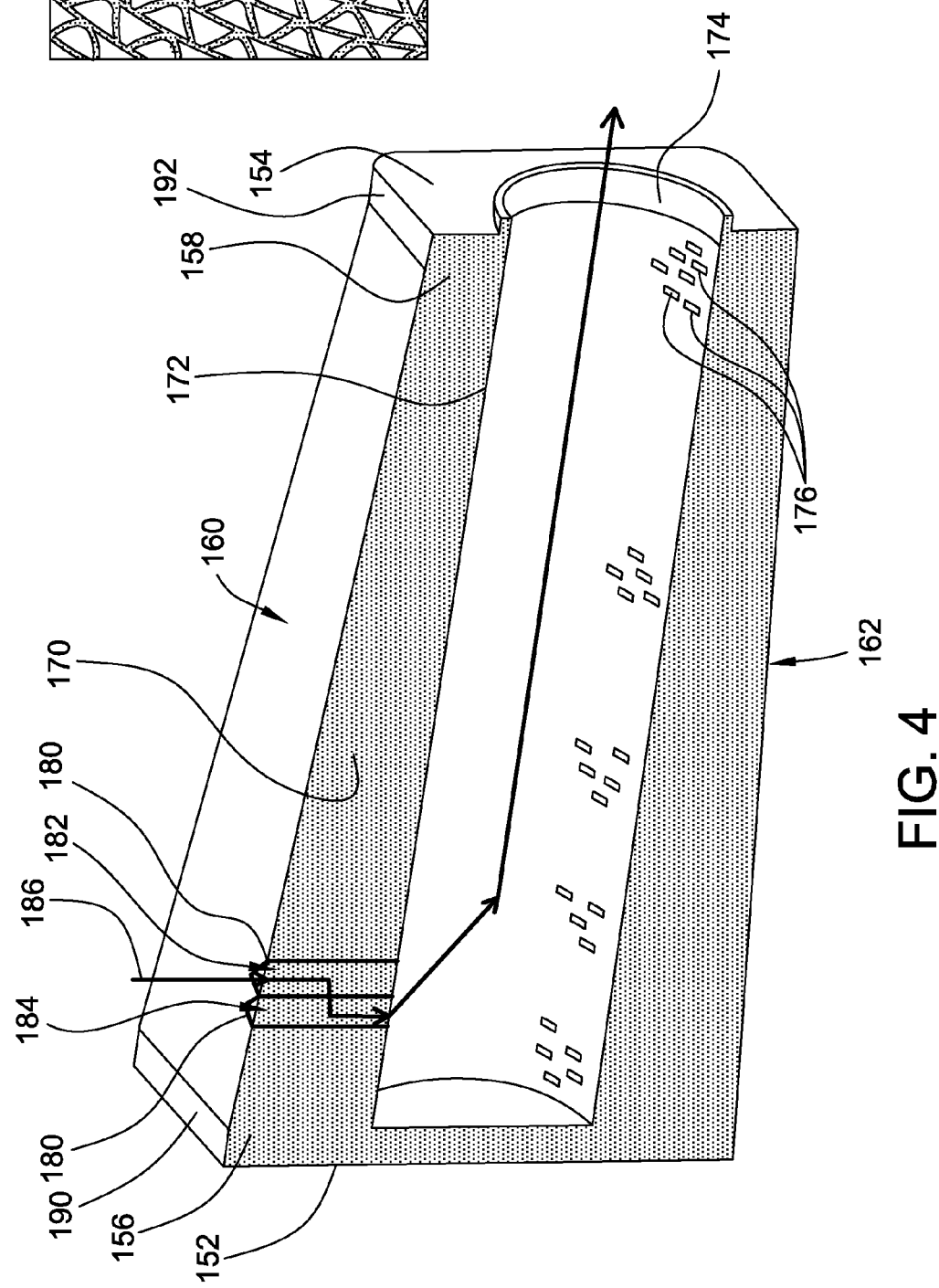
FIG. 4 is a cutaway perspective view of the filter element of FIG. 3 illustrating the filter media disposed around a center tube and indicating a possible flow path of intake air through the filter element.

Referring to FIGS. 3, 4, and 5, to form the material structural of the filter element 150, a filter media 170 can be disposed around a center tube 172 centrally disposed in and longitudinally extending through the filter element so as to correspond to and concentric with the axis line 118. The center tube 172 can be made from a suitable rigid material, such as plastic, and can be cylindrical in shape extending between the first end surface 152 and the second end surface 154. The center tube 172 can be disposed through the second planar end surface 154 to form an outlet aperture 174. In an embodiment, the center tube 172 can be blocked or sealed off by the first end surface 152. To communicate air from the filter media 170 into the interior of the center tube 172, the center tube can include a plurality of perforations 176 disposed through the wall of the center tube axially along its length.

The filter media 170 disposed around the center tube 172 can be any suitable filter media for filtering air or other fluids known to those of skill in the art. For example, the filter media can be made from an air or gas permeable material such as, for example, paper-based materials including paper pulp, a cellulose material, spun polyester, organic or glass fibers, sintered materials, or other filter materials. Referring to FIGS. 4 and 5, in an embodiment, the filter media can be assembled in one or more sheet-like layers that can be folded into a plurality of longitudinal pleats 180 as commonly done with filter materials. The plurality of pleats 180 can be generally parallel and adjacent to each other and provide channels or flutes including, for example, a first flute 184 and an adjacent second flute 184, within the fold of the pleats that facilitate the passage of air through the filter media. The filter media 170 can be arranged so that the pleats 180 and the first and second flutes 182, 184 formed within the pleat folds extend outward from the center tube 172 away from centrally located axis line 118. Accordingly, as illustrated in FIG. 4, the pleats 180 and flutes 182 can extend along a radial line from the center tube 172 to the first exterior surface 160. To provide the planar shape of the exterior surfaces, in an embodiment, the plurality of radially extending pleats of the filter media can be trimmed, sanded or cut by, for example, a saw, a heated wire, a laser or the like along their distal ends to remove excess length and form the flat exterior shapes. In the illustrated embodiment, the plurality of pleats 180 and the flutes formed therein can be generally triangular in shape but in other embodiments can have other shapes.

To force intake air through the filter media, alternating flutes can be blocked at opposite ends so that, for example, the first flute 182 is closed proximate the center tube 172 and the adjacent second flute 184 is closed proximate the first exterior surface 160. Intake air entering a first flute 182 from the first exterior surface will be forced to pass through the filter media into the second flute 184 as indicated by the arrow representing the path of intake airflow 186. As the air is forced to cross the filter media that makes up the pleat 180 and correspond to the flute walls, dust or other contamination is collected in the media material. The first and second flutes 182, 184 thereby cooperate to direct the intake air from the first exterior surface 160 through the filter media to the center tube 172 where the cleaned air can exit the polyhedron filter element 150 through the outlet aperture 174.

In an embodiment, the center tube 172 can have a consistent diameter along the length of the filter element 150. Because of the depending orientation of the exterior surfaces 160, 162, 164, 166 with respect to the axis line 118, the consistent diameter of the center tube 172 results in the filter media 170 being less thick proximate the first element end 156 than proximate the second element end 158. For example, the filter media 170 proximate the first element end 156 may have a first thickness 188 from the first exterior surface 160 to the peripheral wall of the center tube 172 and may have a second thickness 189 proximate the second element end 158 that is less than the first thickness. The difference between the first and second thicknesses 188, 189 of the filter media 170 corresponds to the difference in surface area between the first end surface 152 and the second end surface 154 of the polyhedron-shaped filter element 150. This also means that the length of the plurality of pleats 180 and of the flutes within the pleats will be longer proximate the first element end 156 and shorter proximate the second element end 158.

To maintain the polyhedron-shaped filter element 150 in a rigid or self-supporting structure, the filter element can include a first end cap 190 axially disposed at the first element end 156 and a second end cap 192 axially disposed at the second element end 158. The first and second end caps 190, 192 can be formed by potting or molding the axially opposing first and second element ends 156, 158 in a resilient or compressible material such as, for example, free-rise urethane, nitrile rubber, or any other suitable polymeric material, which can solidify around the axial ends of the filter element. The first and second end caps can have a square or quadrilateral shape that corresponds to the square or quadrilateral shape of the respective first and second planar end surfaces 152, 154. The first and second ends caps 190, 192 can bond the filter media 170 to the rigid center tube 172 so that the filter element maintains the polyhedron shape. To provide further structural support, in various embodiments, rigid inserts may be incorporated into the first and second end caps 190, 192. Additionally, a liner of perforated metal or wire screen can be disposed around the first, second, third, and fourth exterior surfaces 160, 162, 164, 166 to provide further structural support and prevent damage to the filter media 170.

INDUSTRIAL APPLICABILITY

Figure 6:
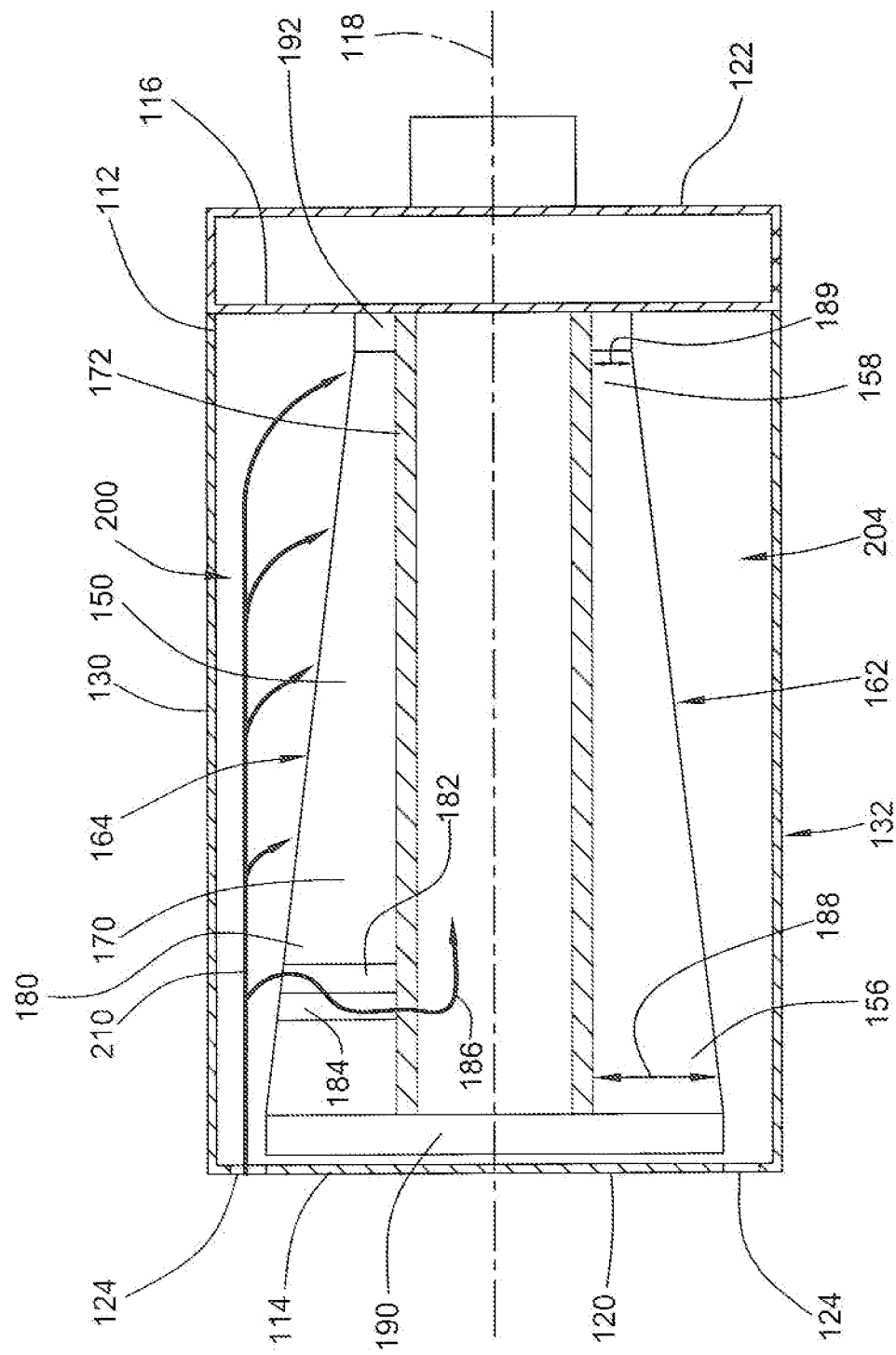
FIG. 6 is a cutaway view of the assembled air cleaner arrangement showing the filter element received in the housing to form a plenum between the exterior surfaces of the filter media and the tubular shell to facilitate the internal distribution of intake air.

The present disclosure is applicable to filtering or cleaning fluids like air for use in applications such as an internal combustion process that produces power for a stationary or mobile machine. Referring to FIG. 6, the filter element 150 in the shape of a tapered polyhedron can be inserted into the tubular shell 112 of the housing 110 so that the taper provided by the depending exterior surfaces of the filter element is oriented toward the second housing cover 122. In various embodiments, the second end cap 192 can directly abut the second housing cover 122 or can make contact with another internal structure disposed in the housing 110. The second element end 158 is accordingly disposed within the second shell edge 116. The first element end 156 is respectively disposed within the first shell edge 114 with the first end cap 190 oriented toward the first housing cover 120. In an embodiment, the first end cap 190 can be smaller in dimension than the first shell edge 114 of the tubular shell 112 so as to avoid blocking the inlet ports 124 while, in other embodiments, the periphery of the first end cap can form a sliding fit with the inside of the first shell edge 114. Moreover, the tubular shell 112 can accommodate the filter element 150 so the filter element aligns with the axis line 118 and the center tube 172 is concentric to the axis line.

Because of the tapering, trapezoidal shape of the filter element 150, at least a portion of the exterior surfaces of the filter element are spaced apart from the interior surfaces of the sidewalls of the tubular. The space between the tubular shell 112 and the filter element 150 can define a plenum 200 that facilitates airflow and circulation within the housing 110. More particularly, with respect to the illustrated embodiment, the first exterior surface 160 of the filter element 150 diverges away from the first sidewall 130 of the tubular shell 112. The diverging exterior surface 160 provided by the polyhedron or trapezoidal shape of the filter element 150 that creates a taper from the first element end 156 to the second element end 158 along the axis line 118 to provide a first gap 202 therebetween. Likewise, the second exterior surface 162 diverges away from the respective second sidewall 132 of the tubular shell to provide a second gap 204 therebetween. It can be appreciated that similar gaps can be delineated between the third and fourth exterior surfaces and the third and fourth sidewalls respectively. The gaps 202, 204 disposed about the polyhedron-shaped filter element 150 together can form the plenum 200 that surrounds the filter element.

In the illustrated embodiment, the first gap 202 can be roughly triangular in shape or profile with the first leg corresponding to the first sidewall 130 of the tubular shell, the second leg corresponding to the second housing cover 122, and the hypotenuse corresponding to the first exterior surface 160 of the polyhedron-shaped filter element 150. The second gap 204 can have a corresponding triangular shape. In other embodiment, the gaps may have different shapes but are formed by the difference between the consistent cross-sectional dimension of profile of the interior chamber 140 and the tapering cross-sectional dimension or profile of the filter element 150. Due to the triangular shape of the gaps, the plenum 200 generally increases or expands in size and volume as the filter element 150 extends from the first shell edge 114 to the second shell edge 116 along the axis line 118.

The plenum 200 can facilitate distribution of the intake air to different portions or areas of the filter media 170 so as to maximize the usefulness of the filter element 150. For example, intake air can enter the plenum 200 through the inlet ports 142 disposed in the tubular shell 112 proximate the first shell edge 114 where the first and second gaps 202, 204 are relatively small and thus corresponding to the reduced section or area of the plenum. As depicted by the arrow illustrating the intake airflow 210, the intake air can proceed axially though the tubular shell 112 with respect to the axis line 118 with the intake air encountering the first exterior surface 160 along the way. The intake air will spread along the exterior surfaces of the filter element 150 and penetrate into the filter media 170 toward the center tube 172. The intake airflow 210 can enter the flutes delineated by the pleats 180 in the filter media 170 whereby the selective blockage of adjacent flutes can redirect the intake airflow 186 can be redirected through the media between the first flute 182 and second flute 184 as described above.

Because of the expanding size of the plenum 200, at least a portion of the intake air is directed axially through the interior chamber 140 toward the second housing cover 122 before entering the filter element 150 at the second element end 158. Without being bound or limited by theory, it is believed that plenum 200 directs or guides at least a portion of the intake air toward the second element end 158 due to the larger volume of the plenum proximate that end. The greater volume of the plenum 200 can correspond to a reduced pressure that draws or directs the intake air axially from the first shell edge 114 to the second shell edge 116. In addition, because of the reduced thickness of the filter media 170 at the second element end 158, the filter element 150 may generate less resistance and has a lower pressure drop at the second element end further encouraging intake air to travel the full axial length of the housing 110. The present design achieves a better distribution of intake air across the axial length of filter element.

A possible advantage of improving the air distribution within the air cleaner arrangement is, as indicated above, better utilization of the filter element from an actual and perceived viewpoint. Because the intake air is more evenly distributed across the filter element by the plenum with a significant amount of intake air directed to the second element end, the filter media traps and/or collects dirt and debris more evenly across its axial length. As a result, the visual appearance of the filter element changes from clean to dirty at a more uniform rate along its length as well. From an operator's viewpoint, even distribution and collection of debris indicates that the filter element has been more fully and/or completely utilized at the time the filter element is replaced. These and other possible advantages of the disclosure are set forth in the accompanying drawings and the foregoing detailed description.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

I claim:

1. An air cleaner arrangement comprising:
   a filter element shaped as a polyhedron, the filter element and extending along and tapering with respect to an axis line between a first end surface and a second end surface, the first end surface and the second end surface orthogonal to the axis line, the first end surface being larger than the second end surface;

a housing including a tubular shell adapted to receive the filter element, the tubular shell extending between a first shell edge and a second shell edge and having a cross-section corresponding in shape to the filter element shaped as a polyhedron, wherein the housing includes a first housing cover disposed at the first shell edge and a second housing cover disposed at the second shell edge, the second housing cover delineating an outlet port disposed therethrough, wherein the first end surface is formed by a first end cap disposed on the first element end of the filter element and the second end surface is formed by a second end cap disposed at the second element end, wherein the filter element comprises a filter media disposed about a center tube extending between a first element end corresponding to the first end surface and a second element end corresponding to the second end surface, the center tube generally concentric to the axis line, and wherein the plenum corresponds in part to a gap having a triangular profile with a first leg corresponding to a first sidewall of the tubular shell, a second leg corresponding to a portion of the second housing cover, and a hypotenuse corresponding to the first exterior surface of the filter element.

2. The air cleaner arrangement of claim 1, wherein the filter element and the tubular shell delineate a plenum expanding in area from proximate the first shell edge to proximate the second shell edge.

3. The air cleaner arrangement of claim 2, wherein the first end surface and the second end surface of the filter element have a quadrilateral shape.

4. The air cleaner arrangement of claim 3, wherein the filter element has a trapezoidal profile parallel to the axis line and oriented toward the second housing cover.

5. The air cleaner arrangement of claim 1, wherein the filter element includes a first exterior surface extending between the first end surface and the second end surface, the first exterior surface having a planar shape and orientated at an angle to the axis line.

6. The air cleaner arrangement of claim 5, wherein the tubular shell includes a sidewall generally opposing the first exterior surface of the filter element, the sidewall extending between the first shell edge and the second shell edge parallel to the axis line.

7. The air cleaner arrangement of claim 1, wherein the filter media comprises a plurality of pleats, each pleat delineating a flute, extending from the center tube to an exterior of the filter media.

8. The air cleaner arrangement of claim 7, wherein the center tube extends concentrically along the axis line and has a generally consistent circular diameter.

9. A method of filtering a fluid comprising:
disposing a filter element shaped as a polyhedron and generally tapering along an axis line inside a housing including a tubular shell having a generally corresponding polyhedron cross-section;
intaking fluid into the air cleaner arrangement through an inlet port disposed in the housing;
distributing fluid in a plenum delineated between an exterior surface of the filter element and an sidewall of the tubular shell, the plenum increasing in area between along the axis line;
directing fluid through the filter element from the exterior surface to a center tube centrally disposed in a filter media, the filter element extending along the axis line between the first element end and a second element end; and
exhausting fluid from the air cleaner arrangement through an outlet port in communication with the center tube,
wherein the plenum corresponds in part to a gap between a planar first exterior surface of the filter element and an opposing first sidewall of the tubular shell, and wherein the gap has a triangular profile with a first leg corresponding to a sidewall of the tubular shell, a second leg corresponding to a portion of a second housing cover mounted to the tubular shell orthogonal to the axis line, and a hypotenuse corresponding to the planar first exterior surface of the filter element.

10. The method of 9, wherein resistance to fluid flow in the filter media of the filter element creates a pressure drop across the filter element, the pressure drop being less proximate the second element end than proximate the first element end.

* * * * *